United States Patent Office 3,120,750
Patented Feb. 11, 1964

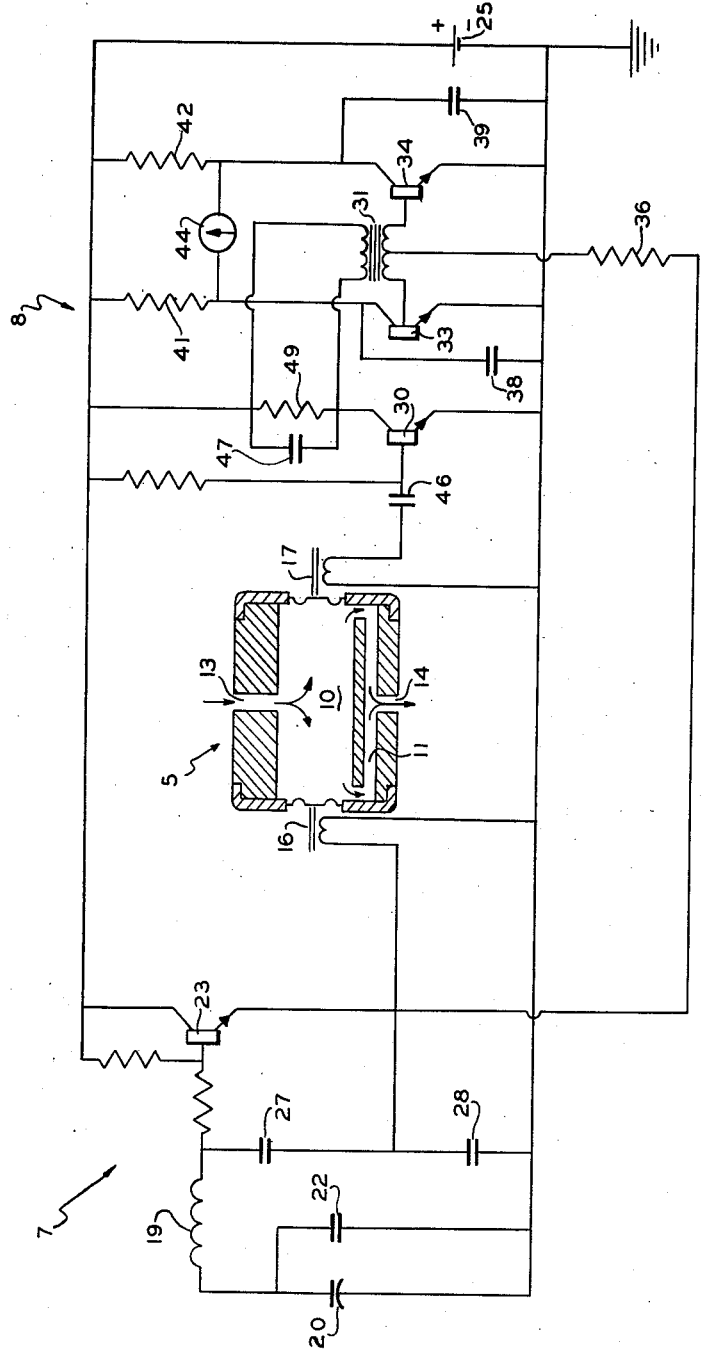

3,120,750
GAS ANALYZER
Elihu Root III, College Hill, Clinton, N.Y.
Filed Nov. 28, 1958, Ser. No. 776,956
3 Claims. (Cl. 73—24)

This invention relates generally to fluid analyzing apparatus, and has particularly reference to a novel electroacoustic analyzing apparatus which utilizes a resonant cavity as a filter and operates by detecting the phase shift that occurs in the vicinity of resonance.

The applicant is aware of the fact that various gas analyzing or testing devices using a resonant cavity have been developed heretofore, but unlike the present invention, most of these devices depend on finding the frequency for maximum amplitude or use the amplitude response as the dominant factor in a feedback loop to control the frequency of an oscillator. However, whereas the amplitude sensitivity of the resonator is nonlinear and its slope goes to zero at the point of resonance, the phase sensitivity is large and highly linear at this point. Accordingly, it is the broad objective of the invention to utilize a phase sensitive detector in a gas analyzer to obtain superior sensitivity and stability.

Another important object of the invention is to provide an improved gas analyzer wherein variations in the sound velocity or sound propagation characteristics of the gas being investigated can be utilized to control regulating and alarm devices.

Still another important object of the invention is to provide a gas analyzer having an improved acoustic resonator which conserves acoustic energy and allows the use of relatively insensitive transducers.

A further important object of the invention is to provide a gas analyzer wherein the resonator is arranged so that, for a given sample volume of gas, it has a high Q and thus has high sensitivity.

Another important object of the invention is to provide a gas analyzer which can be pre-set for a given gas mixture and by means of a null detector can sensitively indicate or control in response to small deviations from the pre-set mixture.

Still another important object of the invention is to provide a gas analyzer wherein the resonator is arranged so that the gas to be investigated enters at a point where it can have the maximum instantaneous effect on the resonant frequency of the cavity. This results in a rapid response which effectively minimizes any tendency there might be to hunt because of lags elsewhere in the apparatus.

A further important object of the invention is to provide a gas analyzer wherein the sample volume requirement is small for a given sensitivity.

A still further important object of the invention is to provide a gas analyzer which can be assembled in a compact and economical manner.

Other objects and advantages will become apparent from the following detailed description of the invention, read in conjunction with the accompanying drawing in which the single figure diagrammatically illustrates a preferred form of the apparatus for carrying out the invention.

In the drawing, the acoustic resonator is generally indicated at 5, and the circuit shown to the left of the resonator comprises an oscillator 7 while the circuit to the right comprises a phase sensitive detector 8. In the embodiment shown, the resonator is formed with two parallel resonant cavities 10 and 11 of unequal volume, the purpose of which arrangement will be explained hereinafter. The gas to be investigated is passed through the resonator by means of inlet and outlet ports 13, 14 at the approximate mid-points of the two cavities which are in communication with one another as shown.

The ends of the resonator are formed with openings in which the diaphragms of a pair of transducers 16, 17 are mounted, the former being a driver or transmitter which converts electrical energy into acoustic energy while the latter is a receiver which does just the opposite. As thus arranged, sound waves transmitted through the resonator by the driver transducer 16 will be picked up by the receiver transducer 17, and the gas to be investigated becomes the sound transmitting medium. Preferably, the transducers at the ends of the resonator should have a sufficiently high mechanical impedance, either by reason of small diaphragm area or otherwise, so that the resonant frequency of the cavity is controlled principally by the dimensions of the air column.

The oscillator 7 is a modified Colpitts oscillator in which coil 19 is the main tuning inductance, variable capacitor 20 is the tuning control and capacitor 22 is a temperature compensating element which will be discussed presently. Also included in the oscillator is a transducer 23, the base electrode of which is connected to one side of the tank circuit. A suitable battery 25 serves as a source of energy for the oscillator and system. Capacitors 20 and 22, coil 19 and capacitors 27, 28 act as a resonant impedance transformer, allowing effective tuning control by a small capacitor without excessive loading by the transistor.

By proper tuning by means of capacitor 20, transistor 23 will receive its D.-C. power through, and drive the driver transducer 16 at substantially the fundamental resonant frequency of the resonator for the gas or gas mixture entering the resonator. The receiver transducer 17 picks up the acoustic signal from the driver and passes it to a transistor 30 which forms a part of the phase sensitive detector and acts as a conventional audio amplifier. The transistor 30 in turn passes the signal to the primary winding of a transformer 31, the secondary winding of which is connected between the base electrodes of a pair of transistors 33, 34.

Transistors 33 and 34 are preferably matched for equal current gain and receive their control current through a resistor 36 that is connected to the approximate mid-point of the secondary of the transformer 31. On its other side, the resistor 36 is connected as shown to the emitter electrode of the transistor 23 so that it receives the same signal that is supplied to the driver transducer 16. With this arrangement, the transistors 33 and 34 can conduct substantial current only during the half of the cycle in which the emitter electrode of transistor 23 is positive.

Voltage induced in the primary of the transformer 31 by the signal received from transistor 30 effectively switches the control current, arriving at the secondary through resistor 36, from transistor 33 to transistor 34 at some point in the cycle. Thus, transistors 33 and 34 conduct alternate current pulses which are smoothed by filter capacitors 38, 39 and appear as D.-C. potentials across resistors 41, 42 connected to the collector electrodes of the two transistors as shown. Connected across the resistors 41, 42 is a suitable indicator 44 which in the embodiment of the invention shown is preferably a D.-C. null meter.

Now if the apparatus or overall circuit just described is in perfect balance, the average currents drawn by transistors 33 and 34 will be equal and the null meter 44 will not be deflected. However, if a gas having a lower sound velocity, i.e. sound propagation characteristics, than that of the initial sample enters the resonator, the resonating cavity will no longer operate at exact resonance and there will be a lagging phase shift in the signal picked up by the receiver transducer 17. This results in delayed switching of the control current arriving at the primary of the transformer 31 so that the current pulse through transistor 33 becomes longer, the pulse through transistor 34 becomes shorter and the null meter is deflected. Conversely, a gas having a higher sound velocity (sound propagation characteristics) will cause a leading phase shift so that the current pulse through transistor 34 becomes longer and the pulse through transistor 33 shorter. The null meter will then be deflected in the opposite direction.

In either of the above cases, the resonator cavity can be brought back into exact resonance by increasing or decreasing the value of capacitor 20 to lower or raise the oscillator frequency as the case may be. This removes the phase shift and rebalances the null meter 44. The variable capacitor 29 can be accurately calibrated in terms of sound propagation characteristics or in terms of gas concentration, and the null meter can be calibrated in terms of small deviations of the gas sample from the value indicated by the setting of capacitor 20. Because the meter 44 is a null indicator, either the signal applied thereto or the mechanical movement of its needle may be amplified and utilized to control regulating or alarm devices in response to deviations of the gas sample.

As will be understood by those familiar with the art, when a resonant cavity is used as a filter the amplitude sensitivity of the filter is non-linear and its slope goes to zero at the point of resonance whereas the phase sensitivity is large and highly linear at this point. Accordingly, the use of a phase detector results in superior sensitivity and stability over those systems which depend on finding frequency for maximum amplitude or use amplitude response as the dominant factor in a feed back loop to control the frequency of an oscillator. When measuring amplitude there are many other factors which affect the system, whereas the arrangement disclosed herein provides for a large signal output at the most sensitive condition.

Even in the apparatus of the invention there are other sources of possible phase shift, particularly in the transducers which preferably should not have sharp resonances close to the cavity frequency. However, the net effect of any such secondary phase shifts is substantially constant and can be compensated for by reducing the value of capacitor 46 or increasing the value of capacitor 47 until the frequency for a null indication on the meter 44 coincides with the frequency of maximum amplitude of the receiver transducer signal. Resistor 49 is connected across the load of transistor 30 to damp out transients if the transistor is overdriven.

The velocity of sound is a function of both compressibility and density. If there are inhomogeneities in the gas mixture in the resonating cavity, the frequency of the cavity will be determined predominantly by the compressibility of the gas at the ends of the cavity and by the density of the gas at the center. In the case of two gases such as oxygen and nitrogen for which the compressibilities are substantially equal while the densities differ, a very small sample coming into the center of the cavity will provide a momentary response larger than would be given by the same sample uniformly mixed with the remainder of the gas in the cavity. When the apparatus is used for mixture regulation, the above effect can be utilized to provide a response lead which may be helpful in overcoming any tendency to hunt as a result of lags elsewhere in the system.

In the particular resonator shown, gas enters the main cavity 10 at the center which according to the standing wave pattern for the fundamental frequency is a point of low sound pressure. Accordingly, there is a minimum tendency for radiation of sound energy out through the inlet port. Likewise, the cross-bar of the outlet T may be thought of as a second cavity 11 in parallel with the first and having substantially the same frequency so that there is a point of low sound pressure at the actual outlet port 14. These two cavities could be of equal diameter, but for a given total sample volume the unsymmetrical arrangement allows a higher Q and consequently higher sensitivity. A particular advantage of the centrally located inlet and unsymmetrical arrangement, as previously noted, is that the gas enters at a point where it can have a maximum instantaneous effect on the resonant frequency of the cavity. A further advantage of the resonator disclosed is that it defines a through flow path which efficiently cleans out the old sample with a minimum of new gas.

The lack of radiation from the inlet and outlet ports and the absence of other openings in the cavity result in the conservation of acoustic energy which increases the Q of the cavity and the phase sensitivity thereby allowing use of a smaller bore and smaller gas sample than would otherwise be required. This in turn allows operation at low power, permits the use of relatively insensitive transducers, and reduces the problem of acoustic insulation between the resonator and its surroundings. In addition, the small sample volume requirement permits accurate testing of stationary or fixed gas samples as well as continuously flowing samples.

Since resonant frequency changes with temperature, the capacitor 22 is provided in the oscillator as a temperature compensating element. Capacitor 22 has its temperature coefficient of capacity adjusted so that the frequency of the oscillator will vary in proportion to variations in the sound propagation characteristics of the gas that are caused by changes in ambient temperature. Preferably, capacitor 22 is mounted in good thermal contact with the resonator and, due to the large mass of the cavity and small volume of the sample, the entering gas comes into thermal equilibrium with the system very quickly.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. In a gas analyzer, an acoustic resonator having low acoustic losses, said resonator being closed at its ends by the diaphragms of, respectively, a driver transducer and a receiver transducer, said resonator being divided into two parallel resonant cavities of substantially equal length but unequal volume, the adjacent ends of said cavities being connected to one another, and an oscillator connected to said driver transducer to excite a standing wave of high amplitude in said resonant cavities at substantially the fundamental resonant frequency of the resonator, said transducer diaphragms being located at points of high acoustic pressure in said resonator adjacent the two junction points of said cavities respectively, said resonator including an inlet port for the gas to be analyzed at a point of low acoustic pressure in the larger volume cavity and an outlet port at a point of low acoustic pressure in the smaller volume cavity so that a substantially complete response to a change in character of the incoming gas is effected before there is a complete change in the character of the gas sample in the cavities.

2. In a gas analyzer employing an acoustic resonator through which the gas to be analyzed is passed, an oscillator, independent means for adjusting said oscillator frequency, a driver transducer driven by said oscillator, a receiver transducer, an acoustic resonator closed at its opposite ends by said transducers respectively, said oscillator being adjusted by said independent means to excite a standing wave in said resonator at substantially the fundamental resonant frequency of the resonator for the gas passing therethrough, said resonator in turn acoustically exciting said receiver transducer, said resonator being divided longitudinally into two parallel, connected cavities of substantially equal length but unequal volume, the two junctions of said cavities being located at and in communication with said transducers respectively, an inlet and an outlet port in said resonator for the gas to be analyzed, said ports being located at points of low acoustic pressure in said resonator, said inlet port communicating with the larger of said cavities and said outlet port communicating with the smaller cavity, and a phase sensitive detector arranged to receive signals from both said oscillator and receiver transducer, said detector being responsive to variations in the phase relationship between the oscillator and receiver transducer signals that are caused by variations in the sound propagation characteristics of the gas, said detector being operable in response to any such variations to generate an electric signal for actuating a control device.

3. In a gas analyzer, an acoustic resonator, a driver transducer connected to one end of said resonator for passing sound waves therethrough, a receiver transducer connected to the other end of said resonator, means for passing a gas to be investigated through said resonator so that the gas becomes the sound transmitting medium between said transducers, an oscillator including means forming a resonant impedance transformer and a transistor having its emitter electrode connected to said driver transducer, said oscillator being operable to supply a signal to said driver transducer at substantially the resonant frequency of the resonator for the sound propagation characteristics of the gas passing therethrough, and a phase sensitive detector arranged to receive signals from both said oscillator and receiver transducer, said detector being responsive to variations in the phase relationship between the oscillator and receiver transducer signals that are caused by variations in the sound propagation characteristics of the gas, said detector including a null meter for indicating said phase relationship variations, said detector also including a pair of transistors matched for equal current gain and a transformer having its secondary connected between the base electrodes of said transistors, said secondary being connected at its approximate midpoint to the emitter electrode of said oscillator transistor, said phase sensitive detector also including a third transistor having its base electrode connected to said receiver transducer and its collector electrode connected to the primary of said transformer, said null meter being connected across the collector electrodes of said pair of matched transistors.

References Cited in the file of this patent

UNITED STATES PATENTS

| | | |
|---|---|---|
| 2,283,750 | Mikelson | May 19, 1942 |
| 2,874,564 | Martin et al. | Feb. 24, 1959 |
| 2,984,097 | Kniazuk et al. | May 16, 1961 |

FOREIGN PATENTS

| | | |
|---|---|---|
| 727,891 | Great Britain | Apr. 13, 1955 |
| 801,757 | Great Britain | July 20, 1956 |
| 785,000 | Great Britain | Oct. 23, 1957 |
| 798,323 | Great Britain | July 16, 1958 |

OTHER REFERENCES

Article: "Sonic Gas Analyzer for Measurement of $CO_2$ in Expired Air," by F. D. Stott, The Review of Scientific Instruments, vol. 28, No. 11, November 1957, pages 914 and 915.

Article: "Ultrasonic Gas Analyzer," by M. Kniazuk et al., Instruments and Automation, vol. 28, November 1955, pages 1916 and 1917.